(12) United States Patent
Zhang et al.

(10) Patent No.: US 12,049,766 B1
(45) Date of Patent: Jul. 30, 2024

(54) TENSEGRITY OFFSHORE WIND POWER GENERATION SUPPORT STRUCTURE

(71) Applicants: Harbin Engineering University, Heilongjiang (CN); North China Electric Power University, Beijing (CN); Shenyang University of Technology, Liaoning (CN)

(72) Inventors: Jianhua Zhang, Heilongjiang (CN); Ke Sun, Beijing (CN); Shuaizheng Wang, Heilongjiang (CN); Zhichuan Li, Tianjin (CN); Dianwei Gao, Liaoning (CN); Lei Qi, Tianjin (CN); Ning Li, Tianjin (CN); Chao Tang, Heilongjiang (CN); Yongqian Liu, Beijing (CN); Hang Meng, Beijing (CN)

(73) Assignees: HARBIN ENGINEERING UNIVERSITY, Heilongjiang (CN); NORTH CHINA ELECTRIC POWER UNIVERSITY, Beijing (CN); SHENYANG UNIVERSITY OF TECHNOLOGY, Liaoning (CN)

( * ) Notice: Subject to any disclaimer, the term of this patent is extended or adjusted under 35 U.S.C. 154(b) by 0 days.

(21) Appl. No.: 18/524,645

(22) Filed: Nov. 30, 2023

(30) Foreign Application Priority Data

Apr. 11, 2023 (CN) .......................... 202310384820.4

(51) Int. Cl.
*E04H 12/20* (2006.01)
*F03D 13/25* (2016.01)

(52) U.S. Cl.
CPC ........... *E04H 12/20* (2013.01); *F03D 13/256* (2023.08); *F05B 2240/93* (2013.01)

(58) Field of Classification Search
CPC ....... E04H 12/20; E04H 12/16; F03D 13/256; F05B 2240/93
See application file for complete search history.

(56) References Cited

U.S. PATENT DOCUMENTS

| | | | | |
|---|---|---|---|---|
| 8,471,399 B2* | 6/2013 | Lefranc | ................... | F03D 13/25 290/55 |
| 2013/0276691 A1* | 10/2013 | Thieffry | .................. | B63B 35/44 114/264 |
| 2017/0190391 A1* | 7/2017 | Siegfriedsen | ........... | B63B 35/44 |

(Continued)

FOREIGN PATENT DOCUMENTS

| CN | 202768241 U | 3/2013 |
|---|---|---|
| CN | 107630790 A | 1/2018 |

(Continued)

OTHER PUBLICATIONS

First Office Action for China Application No. 202310384820.4, mailed Jul. 10, 2023.

(Continued)

*Primary Examiner* — Gisele D Ford
(74) *Attorney, Agent, or Firm* — Pilloff Passino & Cosenza LLP; Rachel K. Pilloff; Sean A. Passino

(57) ABSTRACT

A tensegrity offshore wind power generation support structure is provided, relating to the technical field of offshore wind power. The support structure includes inclined columns, prestressed cables, a rigid support, a floating foundation and anchoring systems. A stable self-balancing space supporting structure is formed by the inclined columns and the cables; the inclined columns inclines outwards, upper parts of the inclined columns are connected with the prestressed cables; the bottom ends of the inclined columns are connected with the floating foundation; the middle parts of the inclined columns are connected with the rigid support; and the floating foundation is fixed with a seabed through the anchoring systems. According to the support structure, a (Continued)

tower in the traditional design is not needed, and all the cables are ensured to be in a tension state through the support of the inclined columns.

4 Claims, 7 Drawing Sheets

(56) References Cited

U.S. PATENT DOCUMENTS

| | | | | |
|---|---|---|---|---|
| 2018/0045179 | A1* | 2/2018 | Hong | F03D 7/0204 |
| 2019/0211804 | A1* | 7/2019 | Siegfriedsen | F03D 1/02 |
| 2020/0208611 | A1* | 7/2020 | Shi | F03D 13/25 |
| 2020/0339230 | A1* | 10/2020 | Hummel | B63B 21/507 |
| 2020/0392946 | A1* | 12/2020 | Wong | B63B 35/44 |
| 2021/0156360 | A1* | 5/2021 | Siegfriedsen | F03D 13/25 |
| 2022/0250722 | A1* | 8/2022 | Siegfriedsen | B63B 5/24 |
| 2024/0011467 | A1* | 1/2024 | Grimsrud | F03D 13/256 |

FOREIGN PATENT DOCUMENTS

| | | |
|---|---|---|
| CN | 114135446 A | 3/2022 |
| CN | 114215695 A | 3/2022 |
| CN | 216232871 U | 4/2022 |
| CN | 115539312 A | 12/2022 |
| KR | 20130047950 A | 5/2013 |
| KR | 101591866 B1 | 2/2016 |

OTHER PUBLICATIONS

Notification to Grant Patent for China Application No. 202310384820.4, mailed Sep. 1, 2023.
First Search Report for China Application No. 202310384820.4 dated Jul. 4, 2023.
Supplementary Search Report for China Application No. 202310384820.4 dated Aug. 29, 2023.

* cited by examiner

TENSEGRITY OFFSHORE WIND POWER GENERATION SUPPORT STRUCTURE

CROSS-REFERENCE TO RELATED APPLICATIONS

This application claims priority of Chinese Patent Application No. 202310384820.4, filed on Apr. 11, 2023, the entire contents of which are incorporated herein by reference.

TECHNICAL FIELD

The disclosure belongs to the technical field of offshore wind power, and in particular to a tensegrity offshore wind power generation support structure.

BACKGROUND

As a clean and renewable energy, wind energy has attracted more and more attention from all countries in the world. Among them, offshore wind power has abundant wind energy resources, which is the main direction of new energy development and utilization. At present, the offshore wind power development in China is mainly concentrated in shallow waters, and the foundation structures of wind turbine generator system are mostly fixed-type. The development of fixed-type offshore wind foundation is limited by factors such as offshore wind energy resources and water depth, and the development of fixed-type offshore wind power is limited. From the perspective of the cost and technology, floating foundations are more suitable for the development of deep-sea.

How to reduce the cost is the most concerned issue of floating wind power technology, and the construction cost of floating foundation is an significant component of the cost of the whole floating wind turbine generator systems. Designers have attempted to use low-cost materials such as concrete to reduce costs. For example, the floating wind power projects such as Hywind Tampen in Norway and Floatgen in France used concrete as the main material. At the same time, researchers have also tried to optimize the floating foundation structure and improve the space utilization of floating platforms to reduce costs and increase efficiency. For example, the patent (Patent No. CN114215695A) discloses a combined offshore wind power system. The floating platform of the combined wind turbine generator system includes five balancing columns, and combines horizontal-axis wind turbines with vertical-axis wind turbines to improve the space utilization rate of the floating platform. Researchers have also improved the form of the tower. For example, the patent (Patent No. CN101571100)) discloses an integral truss-type offshore wind turbine generator system support structure. This disclosure adopts the integral truss-type structure as the support structure, which is applicable to various seabed conditions and a wide range of water depths. These technologies provide goods solution for reducing cost and increasing efficiency of floating wind power from the aspects of the structure and material.

The traditional floating foundation consists of a floating body that supports the weight of wind turbine generator systems and tower, which is fixed on the seabed through anchoring systems. With increasing size of wind turbine generators, the tower height has been increasing, resulting in a decrease in stiffness and an exponential increase in cost. When the tower height increases, the amplitude of vibrations increases while the frequency decreases, leading to a higher risk of resonance with the wind turbine generator. Additionally, the tower is subjected to complex forces including pressure, bending moment, and torque during service. If the tower adopts cantilever members, the structural selection form is not reasonable enough, and the material properties cannot be fully utilized. To address the issues associated with existing technologies, the disclosure provides a spatial support system based on concept of tensegrity, which replaces the traditional tower design, skillfully transfers the external force acting on the system to the floating foundation in the form of tension and compression, thereby improving load-bearing performance and vibration problems, and thus the cost is reduced.

SUMMARY

The objective of the present disclosure is to provide a tensegrity offshore wind power generation support structure to solve the problems existing in the prior art.

In order to realize above objective, the present disclosure provides a tensegrity offshore wind power generation support structure, including anchoring systems, a floating foundation and a supporting mechanism installed on the floating foundation, where the floating foundation is fixed to a seabed through the anchoring systems. The supporting mechanism includes multiple inclined columns fixedly installed at a top of the floating foundation. A top of each of the inclined columns is provided with two inclined cables, and bottom ends of the two inclined cables are respectively fixedly connected with the floating foundation at bottom ends of two adjacent inclined columns; horizontal cables are fixedly installed between the two adjacent inclined columns, and both the horizontal cables and the inclined cables are arranged at same joints of the inclined columns, and tension is applied to both the horizontal cables and the inclined cables, and the horizontal cables, the inclined cables and the inclined columns jointly form a spatial cable-inclined column support system; a rigid support is arranged among the multiple inclined columns, the multiple inclined columns are all fixedly connected with the rigid support, and the rigid support is arranged at middle and lower parts of the inclined columns.

Optionally, the floating foundation is a triangular prism structure, a number of the inclined columns is three, and the three inclined columns are respectively arranged at three corners of a top end of the floating foundation, and the rigid support is rigid triangular support.

Optionally, the inclined columns are obliquely arranged towards opposite sides of a top surface of the floating foundation, and the three inclined columns are symmetrically distributed in space; cantilevered support platforms are fixedly installed at top ends of any two inclined columns, and the cantilevered support platforms are used for installing wind turbine generator systems, and the two wind turbine generator systems face in same directions.

Optionally, the cantilevered support platforms are arranged along a horizontal direction, and an included angle between the cantilevered support platforms and the inclined columns is an obtuse.

Optionally, the floating foundation includes three pontoons, the three pontoons are arranged in a triangle, and two adjacent pontoons are fixed by connecting beams; the two inclined cables fixedly installed on a same pontoon are arranged in an isosceles triangle, and connection points between the inclined cables and tops of the inclined columns are located at same heights.

Optionally, a relative rotation angle θ between a triangle formed by upper end points of the inclined columns and a triangle formed by bottom end points of the inclined columns is 55°-65°.

Optionally, surfaces of the horizontal cables and the inclined cables are all subjected to anti-corrosion treatment.

Optionally, bottoms of the inclined columns are fixedly connected with the floating foundation through flanges, and the middle and lower parts of the inclined columns are connected with the rigid support through bolts or welding, and the rigid support is made of one of round steel pipes, section steels or trusses.

Optionally, the distance from the sea level to the blades of the wind turbines when they are at lowest points is not less than a required safety distance; a gap is arranged between the blades of the two wind turbines, and the length of the gap is not less than a diameter length of the blades of the wind turbines.

Compared with the prior art, the disclosure has the following advantages and technical effects.

Firstly, in this embodiment, the internal force self-balancing system is composed of inclined columns and cables to replace the traditional tower; the cables with high tensile strength bear tension force while the inclined columns bear compression force, the force transmission path is clear and the distribution of forces is reasonable. The whole structural system has good load-bearing capacity, thereby improving the utilization rate of materials, saving materials and reducing self-weight.

Secondly, in the embodiment, a tensegrity structure includes the inclined columns and the cables, which are in a spatial stress state, and all rod members are stressed cooperatively; the external forces acting during the wind turbines operation are transmitted to one of the inclined columns, In addition to transferring the load downward, the inclined column partially transfers the load to other inclined columns through horizontal tension cables, so that the external force received by the system is skillfully transmitted to the floating foundation evenly, thus enhancing structural stability of the device.

Thirdly, the tensegrity offshore wind power generation support structure includes rigid inclined columns and flexible tension cables, and has the characteristics of both rigidity and flexibility, the motion response of the structure under the action of wind and waves is reduced, and the dynamic characteristics of the structure is improved. Responding to the motion response of the complex weather environment at sea, and a more stable working environment is provided for the upper wind turbine generator systems.

BRIEF DESCRIPTION OF THE DRAWINGS

In order to explain the embodiments of the present disclosure or the technical scheme in the prior art more clearly, the drawings needed in the embodiments will be briefly introduced below. Apparently, the drawings described below are only some embodiments of the present disclosure, and other drawings can be obtained according to these drawings without creative work for ordinary people in the field.

DETAILED DESCRIPTION OF THE EMBODIMENTS

Figure 1:
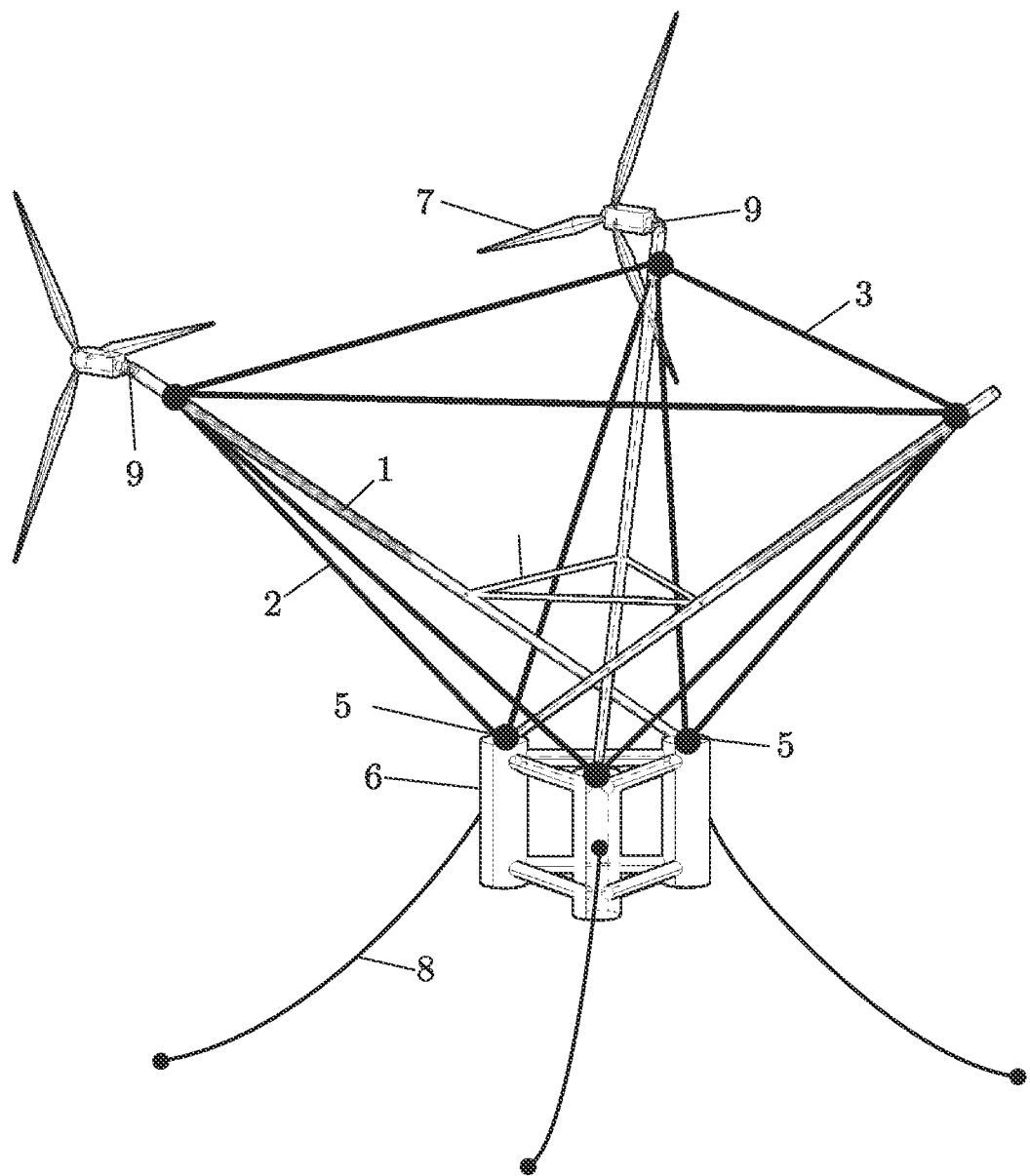
FIG. 1 is an isometric view of a tensegrity offshore wind power generation support structure according to the present disclosure.
Figure 2:
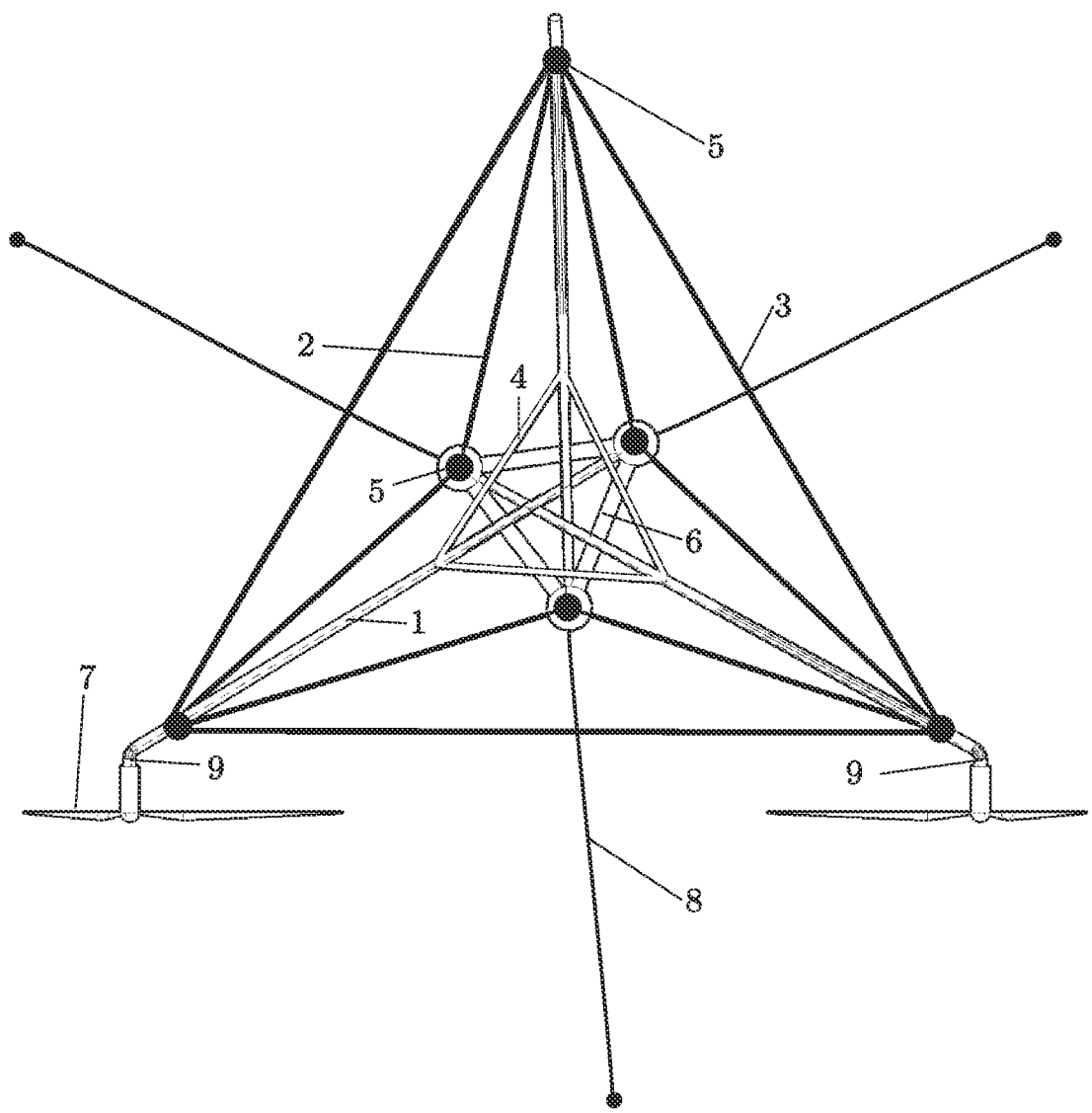
FIG. 2 is a top view of the tensegrity offshore wind power generation support structure according to the present disclosure.
Figure 3:
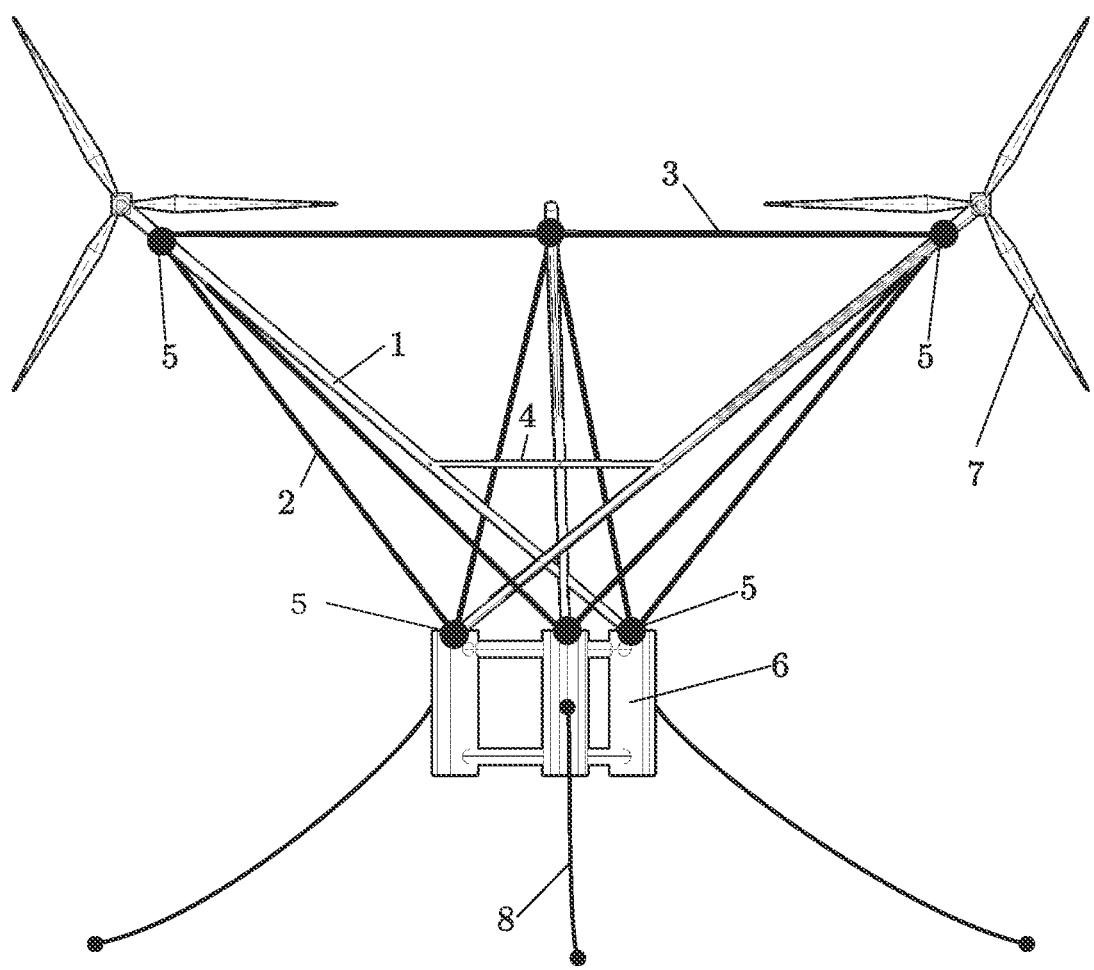
FIG. 3 is a front view of the tensegrity offshore wind power generation support structure according to the present disclosure.

It should be noted that the embodiments in the present disclosure and the features in the embodiments can be combined with each other without conflict. The described embodiment is only a part of the embodiment of the present disclosure, not all of the embodiment. All other embodiments obtained by ordinary people in the field without creative effort belong to the scope of protection of the present disclosure. The present disclosure will be described in detail with reference to the attached drawings and examples.

As shown in FIGS. 1 to 7, the present disclosure provides a tensegrity offshore wind power generation support structure, taking the tensegrity of three columns and nine cables as an example, which includes anchoring systems 8, a floating foundation 6 and a supporting mechanism installed on the floating foundation 6. The floating foundation 6 is a triangular prism structure, and the floating foundation 6 is fixed with the seabed through the anchoring systems 8. The supporting mechanism includes three inclined columns 1 fixedly installed at the top of the floating foundation 6, and the three inclined columns 1 are respectively arranged at three corners of the top of the floating foundation 6. The top of each inclined columns 1 is provided with two inclined cables 2 and the bottom ends of the two inclined cables 2 are respectively fixedly connected with the floating foundation 6 at the bottom ends of two adjacent inclined columns 1. The horizontal cable 3 is fixedly installed between every two adjacent inclined columns 1. Both the horizontal cables 3 and the inclined cables 2 are arranged at the same position where they are connected with the inclined column 1. Prestress is respectively applied to the horizontal cables 3 and the inclined cables 2. The horizontal cables 3, the inclined cables 2, and the inclined columns 1 jointly form a spatial cable-inclined column support system, thereby achieving the overall stability of the structure. A rigid support is arranged among the three inclined columns 1, and the rigid support is rigid triangular support 4. The three inclined columns 1 are fixedly connected with the rigid support by bolts or welding, and the rigid support is arranged at the middle and lower parts of the inclined columns 1.

In the embodiment, in order to ensure the overall stability of the structure, the inclined column 1 are obliquely arranged towards the opposite sides of the top surface of the floating foundation 6 respectively, and the three inclined columns 1 are symmetrically distributed in space. With the staggered three inclined columns 1, a triangular structure can be formed again under the rigid support, so that the three inclined columns 1 are mutually supported by the inclined cables 2 and the horizontal cables 3, and the rigid triangular support 4 is combined, so that the whole structure is more stable. At the same time, cantilevered support platforms (9)

are fixedly installed at the top ends of any two of the inclined columns 1, and the cantilevered support platforms (9) are used for installing wind turbine generator systems 7, and the two wind turbine generator systems 7 face in the same directions. The cantilevered support platforms (9) are arranged along a horizontal direction, the angle between each of the cantilevered support platforms (9) and the corresponding one of the inclined columns 1 is obtuse. Because the two wind turbine generator systems 7 are oriented in the same direction, the resistance of wind turbine generator systems 7 driven by wind is basically the same, thus the acting force on the whole structure is avoided or reduced and the stability of the whole structure is ensured.

In an embodiment, the floating foundation 6 includes three pontoons. The three pontoons are arranged in a triangle, and two adjacent pontoons are fixed by connecting beams. Two inclined cables 2 fixedly installed on the same pontoon are arranged in an isosceles triangle, and the connection points between the inclined cables 2 and the tops of the inclined columns 1 are located at the same height.

Figure 4:
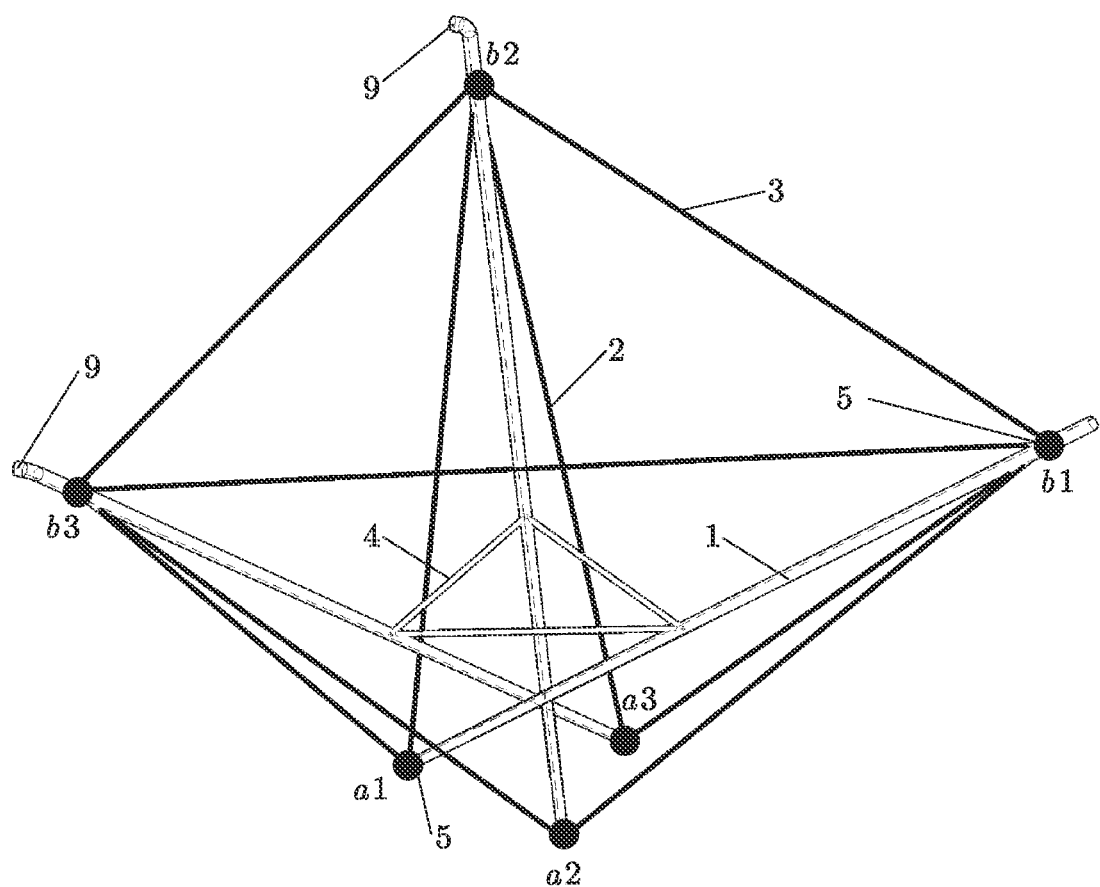
FIG. 4 is an isometric view of a supporting mechanism according to the present disclosure.
Figure 5:
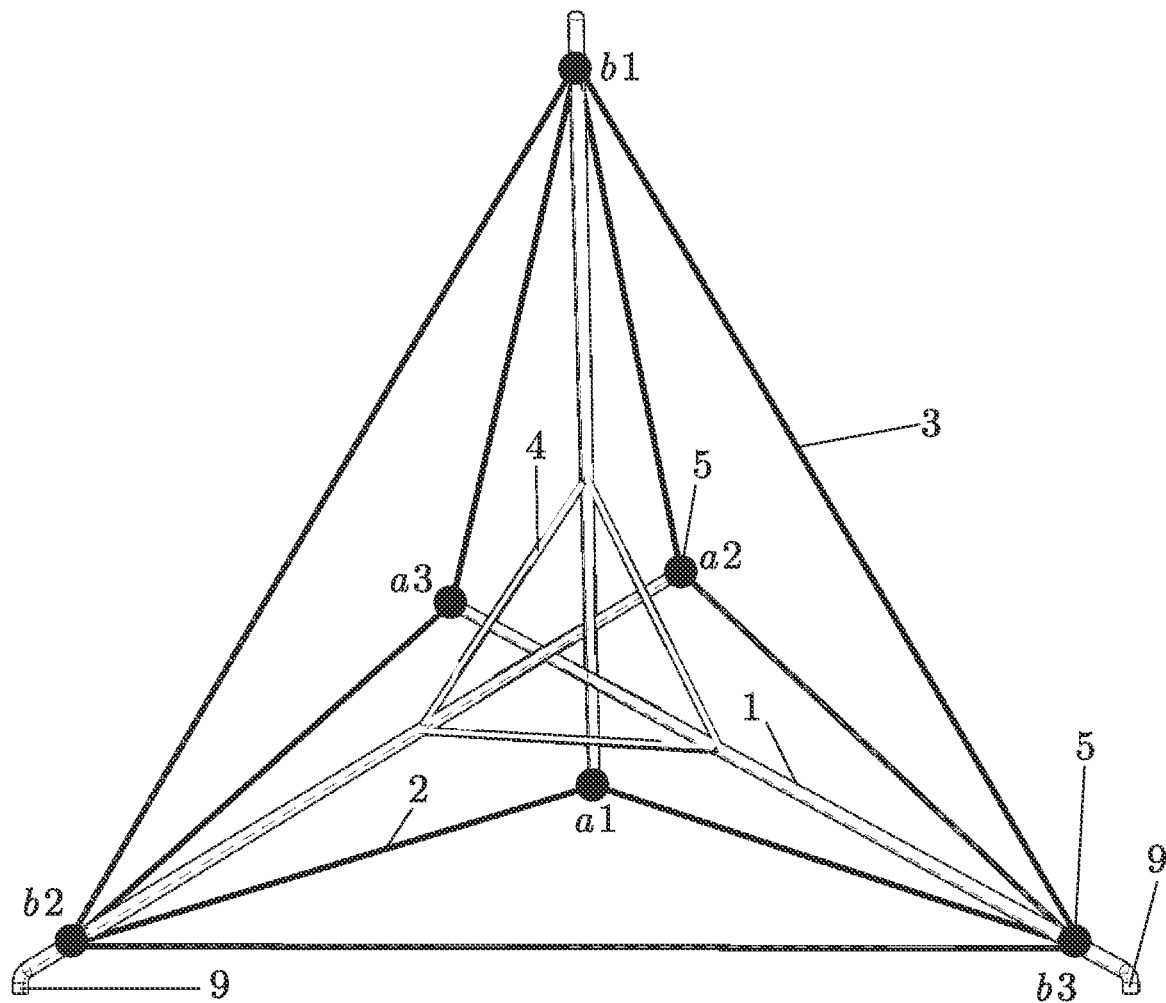
FIG. 5 is a top view of the supporting mechanism according to the present disclosure.
Figure 6:
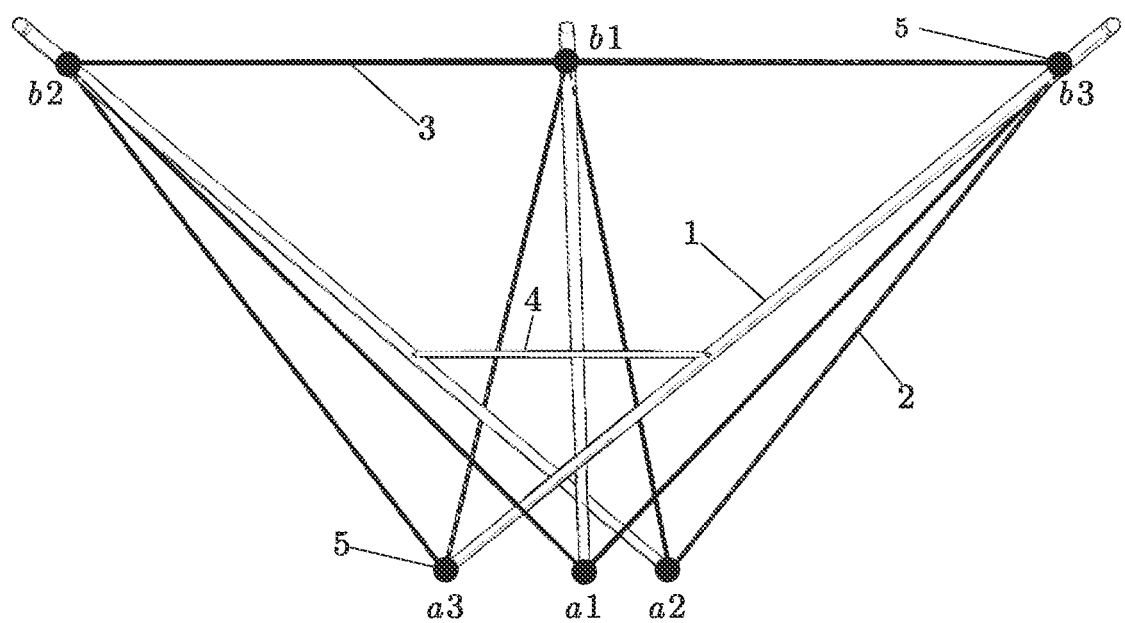
FIG. 6 is a front view of the supporting mechanism according to the present disclosure.

As shown in FIGS. 4 to 6, the letters $a_i$, $b_i$ (i=1, 2, 3) of all nodes in the figures and the coordinates of points are the main parameters that determine the overall shape of tensegrity, such as the length between nodes $a_1$-$a_2$, which can be taken according to the geometric parameters of floating foundation.

In the embodiment, the relative rotation angle $\theta$ between the triangle formed by the upper end points of the inclined columns 1 and the triangle formed by the bottom end points of the inclined columns 1 is 55°-65°.

Figure 7:
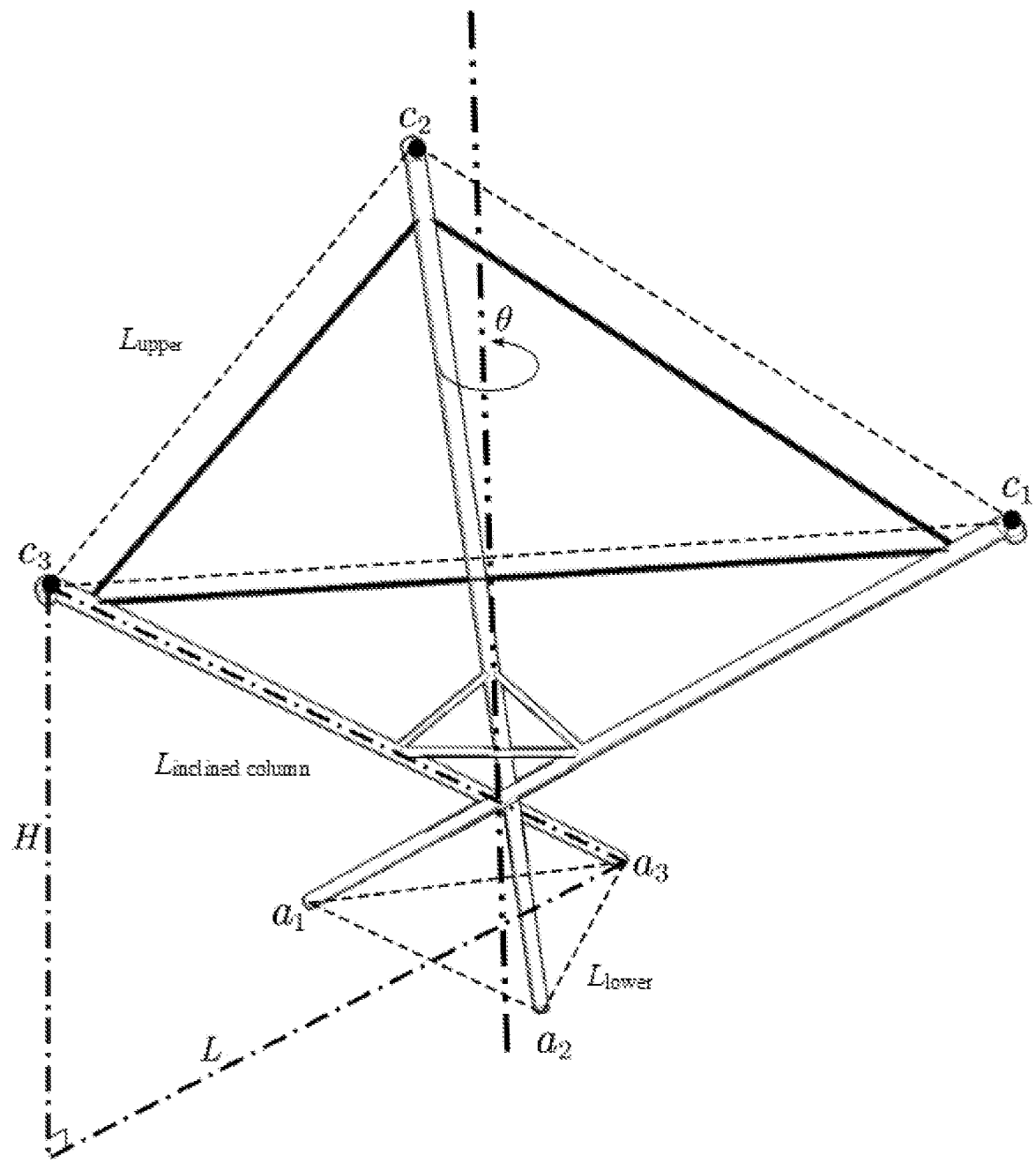
FIG. 7 is a schematic calculation diagram of the tensegrity offshore wind power generation support structure according to the present disclosure.

As shown in FIG. 7, for a tensegrity supporting structure including three inclined columns 1, the length $L_{inclined\ columns}$ of the inclined column 1 can be determined according to the height H of the supporting structure, the side lengths $L_{upper}$ (dotted line at the top in FIG. 7) of the triangle formed by the three end points $c_i$ (i=1, 2, 3) of the top of the inclined columns 1, the side lengths $L_{lower}$ (dotted line at the bottom in FIG. 7) of the triangle formed by the three end points $a_i$ of the bottom of the inclined columns 1 and the relative rotation angles $\theta$ (dotted line with two dots in FIG. 7) of the upper and lower triangles. The lengths $L_{inclined\ columns}$ of the inclined columns 1 can be calculated by the following formula:

$$L_{inclined\ columns} = \sqrt{H^2 + \left(\frac{L_{upper}}{3}\right)^2 + \left(\frac{L_{lower}}{3}\right)^2 - \left(\frac{2 \cdot L_{upper} \cdot L_{lower}}{3}\right)^2 \cdot \cos\left(\frac{2\pi}{3} + \theta\right)}$$

In an embodiment, in order to prolong the service life of the cables, the surfaces of the horizontal cables 3 and the inclined cables 2 are all subjected to anti-corrosion treatment.

In an embodiment, the bottoms of the inclined columns 1 are fixedly connected with the floating foundation 6 through the flanges 5, and the middle and lower parts of the inclined columns 1 are connected with the rigid support through bolts or welding. The rigid support is made of one round steel pipe, section steel or truss.

In the embodiment, in order to prevent the wind turbine generator systems 7 from interference during the running, the distance from the sea level to the blades of the wind turbine generator systems 7 when they are at the lowest points is not less than the required safety distance. A gap is arranged between the blades of the two wind turbine generator systems 7, and the length of the gap is not less than the diameter length of each of the blades of the wind turbine generator systems 7.

The disclosure relates to a method for installing a tensegrity offshore wind power generation support structure, which includes the following steps.

Step 1, cantilevered support platforms (9) are installed at the top end points of the inclined columns 1, the cantilevered support platforms (9) and the inclined columns 1 are in the shape of hockey stick.

Step 2, three inclined columns 1 are installed on the floating foundation 6, and the endpoints of the top ends of the three columns 1 are rotatably arranged in the same direction, so that the distance among the middle positions of the inclined columns 1 meets the length of the rigid triangular support 4, thereby facilitating the installation of rigid triangular support 4.

Step 3, the rigid triangular support 4 is welded or bolted at the middle positions of the inclined columns 1, the rigid triangular support 4 can be one of rigid members such as round steel pipe, section steel, or truss.

Step 4, horizontal cables 3 and inclined cables 2 are installed below the top end points of the three inclined columns 1. The horizontal cables 3 are distributed in a triangle shape, and the bottom ends of the inclined cables 2 are respectively hinged with two adjacent pontoons of the floating foundation 6. The initial prestress is applied to the horizontal cables 3 and inclined cables 2 to ensure that the structure has certain rigidity and can bear the self-weight of the structure and the self-weight load of two wind turbine generator systems.

Step 5: the wind turbine generator systems 7 are respectively installed on the cantilevered support platforms (9), and re-tensioning the horizontal cables 3 and the inclined cables 2 according to the design requirements to ensure that the prestress in the cables reaches the design value.

The above is only the preferred embodiment of this disclosure, but the protection scope of this disclosure is not limited to this. Any change or replacement that can be easily thought of by a person familiar with this technical field within the technical scope disclosed in this disclosure should be included in the protection scope of this disclosure. Therefore, the protection scope of this disclosure should be based on the protection scope of the claims.

What is claimed is:

1. A tensegrity offshore wind power generation support structure, comprising:
   anchoring systems,
   a floating foundation; and
   a supporting mechanism installed on the floating foundation,
   wherein the floating foundation is fixed with a seabed through the anchoring systems; the supporting mechanism comprises a plurality of inclined columns fixedly installed at a top of the floating foundation, a top of each of the inclined columns is provided with two inclined cables, and bottom ends of the two inclined cables are respectively fixedly connected with the floating foundation at bottom ends of two adjacent inclined columns;
   a horizontal cable is fixedly installed between the two adjacent inclined columns, both the horizontal cable and the inclined cables are arranged at a same joint of the inclined columns, and prestress is applied to both the horizontal cable and the inclined cables, and the horizontal cable, the inclined cables and the inclined columns jointly form a spatial cable-inclined column support system; a rigid support is arranged among the plurality of inclined columns, the plurality of inclined columns are all fixedly connected with the rigid support, and the rigid support is arranged at middle or lower parts of the inclined columns through connecting elements;

the floating foundation is a triangular prism structure, a number of the inclined columns is three, and three inclined columns are respectively arranged at three corners of a top end of the floating foundation, and the rigid support is a rigid triangular support;

the inclined columns are obliquely arranged towards opposite sides of a top surface of the floating foundation, and the three inclined columns are symmetrically distributed in space; Cantilevered support platforms are fixedly installed at top ends of two of the inclined columns through connecting elements, providing support for the nacelle of the wind turbine in a cantilevered manner, and the two wind turbine generator systems have same orientations;

a relative rotation angle θ between a triangle formed by upper end points of the inclined columns and a triangle formed by bottom end points of the inclined columns, after projecting the two triangles onto the horizontal plane, which is 55°-65°, and wherein the floating foundation comprises three pontoons, the three pontoons are arranged in a triangle, and two adjacent pontoons are fixed by connecting beams; the two inclined cables fixedly installed on a same pontoon are arranged in an isosceles triangle, and connection points between the inclined cables and tops of the inclined columns are located at a same height.

2. The tensegrity offshore wind power generation support structure according to claim 1, wherein surfaces of the horizontal cable and the inclined cables are all subjected to anti-corrosion treatment.

3. The tensegrity offshore wind power generation support structure according to claim 1, wherein bottoms of the inclined columns are fixedly connected with the floating foundation, and the middle or lower parts of the inclined columns are connected with the rigid support through bolts or welding, and the rigid support is made of one of round steel pipe, section steel or truss.

4. The tensegrity offshore wind power generation support structure according to claim 1, wherein when one blade of the wind turbine is positioned perpendicular to the sea level, a distance from a sea level to the blade tip is not less than 25 meters; a gap between the blade tip of one wind turbine and that of another wind turbine is not less than a diameter length of each of the blades of the wind turbine power generator systems.

* * * * *